Figure 1:
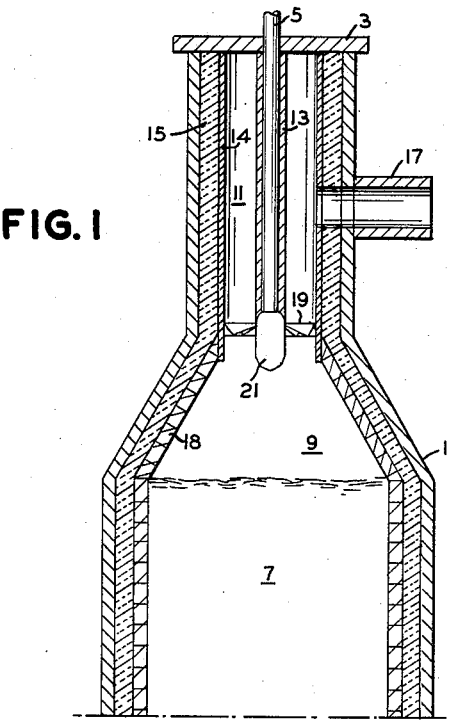

June 28, 1960 C. K. MADER 2,943,062
CONVERSION OF HYDROCARBONS TO A HYDROGEN-RICH GAS
Filed Jan. 19, 1956

INVENTOR.
CHARLES K. MADER
BY
ATTORNEYS

United States Patent Office 2,943,062
Patented June 28, 1960

2,943,062

CONVERSION OF HYDROCARBONS TO A HYDROGEN-RICH GAS

Charles K. Mader, Suffern, N.Y., assignor to The M. W. Kellogg Company, Jersey City, N.J., a corporation of Delaware Filed Jan. 19, 1956, Ser. No. 560,238

2 Claims. (Cl. 252—373)

This invention relates to method and means of mixing gasiform materials. More particularly it relates to method and means of introducing gasiform reactants into a reaction zone. Still more particularly it relates to method and means for intimately mixing and introducing a hydrocarbon vapor, steam and oxygen into a catalytic reaction zone.

Hydrogen and mixtures of hydrogen and carbon monoxide have found widespread use as synthesis materials in the preparation of various organic and inorganic compounds. For example, ammonia is prepared by the catalytic combination of hydrogen and nitrogen, and mixtures of hydrogen and carbon monoxide are useful in the synthesis of hydrocarbons including those boiling in the gasoline range and oxygenated hydrocarbons such as alcohols and ketones.

Almost any petroleum fraction existing as a gas under atmospheric conditions or capable of being vaporized at an elevated temperature may be used as feed material in the preparation of hydrogen and/or carbon monoxide. Natural gas or normally gaseous hydrocarbons are usually preferred because of their availability, ease of handling and resistance to cracking and carbon formation, however, heavier hydrocarbon fractions including gasoline, kerosene, naphtha, distillates, gas oils and residual oils have been used as feed materials. In addition, coal distillation gas and effluent from the gasification of coal have been found useful in preparing the synthesis gases.

The manufacture of a synthesis gas, suitable for example for use in the production of ammonia, is carried out by reforming a hydrocarbon in the presence of an oxidizing agent. Several methods of reforming are available, both catalytic and non-catalytic, and these methods include the use of a number of oxidizing agents such as, for example, water, carbon dioxide, oxygen and oxygen containing gases. Although the term reforming applies to the use of any oxidizing agent, the reaction which involves the use of oxygen or an oxygen containing gas is often referred to more specifically as partial oxidation. The methods of reforming are illustrated by the reactions given below, with partial oxidation taking place in the manner shown by reaction 1 and other reforming reactions taking place according to reactions 2 and 3.

(1) $2CH_4 + O_2 \rightarrow 2CO + 4H_2$
(2) $CH_4 + H_2O \rightarrow CO + 3H_2$
(3) $CH_4 + CO_2 \rightarrow 2CO + 2H_2$

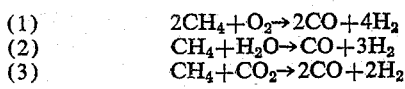

Reforming processes generally can be carried out in the presence of a catalyst, however, in the case of partial oxidation, a catalyst is not necessary although a non-catalytic operation results in a substantially higher temperature than a catalytic process. The oxygen required in the partial oxidation reaction may be supplied by using oxygen, air or air enriched with oxygen. Preferably air or oxygen enriched air is used, as it provides a convenient source of the nitrogen required in the ammonia synthesis. The oxygen necessary for reforming, as apparent from reactions 2 and 3, may also be obtained from water, or carbon dioxide or a mixture thereof. Inasmuch as the partial oxidation reaction is exothermic and the other reforming reactions are endothermic, it has been found desirable to combine the two types of processes to conserve thermal energy. In addition, by controlling the extent to which each type of reaction takes place, it is possible to control the ratio of hydrogen to nitrogen produced to obtain a suitable gas for use in the synthesis of ammonia. Accordingly, a two-step process consisting of primary reforming with steam or carbon dioxide followed by partial oxidation or secondary reforming with oxygen is used in the method of this invention.

One of the principal problems encountered in carrying out oxidation and reforming of hydrocarbons and carbonaceous materials to produce a synthesis gas is the tendency for the reactions to proceed in such a manner that carbon or coke is formed. This decreases the yield of desirable products slightly and in addition causes catalyst fouling and plugging of equipment and requires special equipment to remove the carbon to avoid interrupted production and costly shutdowns.

It is an object of this invention to provide improved method and means for carrying out the partial oxidation and reforming of hydrocarbons and carbonaceous materials.

It is another object of this invention to provide improved method and means for preparing gases useful in the synthesis of hydrocarbons, ammonia and oxygenated organic compounds.

It is still another object of this invention to provide novel method and means for minimizing carbon deposition in the partial oxidation and reforming of hydrocarbons and carbonaceous material.

Still another object of this invention is to provide improved method and means for mixing and introducing gases into a catalytic reaction chamber.

Yet another object of this invention is to provide improved method and means for mixing and introducing a gaseous hydrocarbon and oxygen into a catalytic reaction zone.

Another object of this invention is to provide method and means for decreasing catalyst failure in the catalytic partial oxidation and reforming of hydrocarbons and carbonaceous material.

In the method of this invention an oxygen containing gas is introduced into a stream of hydrocarbon vapor in a mixing zone superposed above a catalytic bed in the form of a plurality of streams of high velocity and small cross-section in such a manner that thorough mixing is obtained before the gases leave the mixing zone. In one aspect of the invention the oxygen streams form one or more cones within the mixing zone, the apex of which lies on the central longitudinal axis of the said chamber. The oxygen streams may either converge on or diverge from said axis depending on their points of introduction into the mixing zone. In another aspect of the invention, the oxygen streams are disposed so as to impart tangential motion to the oxygen with the result that the said streams converge in a circle perpendicular to the central longitudinal axis of the mixing zone and centered on said axis. In still another aspect of the invention, the hydrocarbon reactant is introduced to the mixing zone with a tangential movement to promote mixing. In yet another aspect, this invention comprises introducing and mixing the preheated gases according to the procedures described and further passing the gaseous mixture into a catalytic reaction chamber so that the gases leaving the mixing zone are immediately in contact with the catalyst.

As mentioned before, one of the most troublesome problems in carrying out reactions involving oxygen and hydrocarbons, more particularly in the partial oxidation and/or reforming of hydrocarbons to produce mixtures of hydrogen and carbon monoxide, is the formation of carbonaceous deposits. There are several disadvantages which may result from this. In general, when a catalytic process is being utilized, carbon formation is undesirable because the carbon deposits on the catalyst, thereby decreasing the activity of the catalyst and increasing the pressure drop through the catalyst bed. In either a catalytic or a non-catalytic process carbon deposition can mean equipment plugging, plus special equipment to remove it, and equipment failure with costly shutdowns and loss of production. Since carbon deposition is a result of failure to properly control reaction conditions, it is often accompanied by excessive temperatures which may lead to catalyst failure and failure of mixing equipment and nozzles or other equipment used for introducing the reactants.

Both partial oxidation and reforming of hydrocarbons are carried out at elevated temperatures, usually higher than the temperature at which initial cracking of the hydrocarbons, particularly the heavier hydrocarbons occurs. It is difficult, therefore, in carrying out the preparation of a gas for use in the synthesis of ammonia, hydrocarbons and organic compounds to avoid passing through a temperature range which is conducive to carbon deposition. Although the reason therefor is not clearly understood, cracking of hydrocarbons to carbon takes place at a much lower rate when the partial oxidation and reforming reactions are carried out in the presence of a catalyst. Furthermore, combining these processes is a particularly effective means of suppressing carbon formation. The problem then is primarily one of getting the reactants through the carbon producing phase and into the catalyst mass as quickly as possible. Whether this is accomplished in a combination partial combustion and reforming process or whether partial combustion alone is contemplated is to be determined by various considerations, including feed material, product composition desired, extent of preheat, etc. In either event, the problem is the same and its solution lies within the scope of this invention.

As mentioned previously, the preparation of a synthesis gas may be carried out either with or without a catalyst. The reforming reactions in particular are benefitted by catalytic action. Partial combustion of hydrocarbons with oxygen in the presence of a catalyst is characterized by high temperatures, usually between about 1200° F. and about 2400° F., whereas reforming with steam or carbon dioxide is customarily carried out at a lower temperature between about 1200° F. and about 1800° F.

Non-catalytic partial combustion requires still higher temperatures, that is, between about 2200° F. and about 3000° F. The nature of the reactions is such that reforming supplies a substantially higher hydrogen to carbon monoxide ratio than does partial combustion. As a result flexibility in product distribution is obtained by using a combination process. In addition, the thermodynamics of reforming and partial combustion make a combined conversion process especially attractive since the heat required for reforming is supplied from the heat given off in the exothermic partial combustion reactions. These constitute excellent reasons for combining reforming and partial combustion rather than carrying them out separately. The application of this invention will be discussed in conjunction with a combined process; however, this is not intended in any way to limit the scope of the invention.

The reactions may be carried out at atmospheric pressure or at elevated pressures. The preferred pressure range is between about 150 and about 500 pounds per square inch gage. Operation under pressure is advantageous since the processes which utilize the reaction products are normally carried out at elevated pressures.

Numerous catalysts are available for carrying out the reforming of hydrocarbons. Especially preferred are nickel, chromium, cobalt and oxides thereof which may be used either singly or in mixtures of varying compositions. Similar catalysts are also effective in carrying out partial combustion of hydrocarbons. For best results the catalyst is used in combination with a conventional high temperature refractory material such as alumina, zirconia, firebrick, etc., preferably by being deposited or supported thereon. The percentage of metal or metal oxide combined with the refractory varies from as low as about 5 percent to as high as about 30 percent depending upon the reaction conditions, catalyst and product composition desired.

The catalytic materials used in carrying out this invention may be placed in the reactor in several arrangements. In one arrangement, a highly refractory material having mild reforming properties is placed at the feed entrance and followed by a less refractory material having more active reforming properties. The catalytic material may comprise distinct separate zones or layers, or may be intermixed in appropriate proportions so that there will be a gradual or progressive increase in catalyst activity from the entrance to the exit of the catalyst bed. The most convenient arrangement is a vertical reactor with the feed entrance at the top and the product exit at the bottom with a catalyst bed appropriately disposed therein. However, the process may be carried out with equally good results in a horizontal vessel or, if a vertical vessel is preferred, the catalyst arrangement may be reversed so that the reactants enter the bottom of the reactor and pass upward through the contact materials, without departing from the scope of this invention.

When separate beds or layers of catalytic material are used, the first or less active bed usually comprises between about 5 percent to about 80 percent by volume of the total contact material with the preferred amount being between about 15 percent to about 70 percent by volume. If a single bed of catalytic material with gradual or progressively changing composition is used, the same proportions should be observed.

A suitable less active catalytic material comprises a refractory support having deposited thereon a small amount of nickel oxide, chromia, or mixtures thereof. If nickel oxide is used to impart the reforming properties, the amount may vary between about 4 percent and about 10 percent by weight with about 6 percent by weight being preferred. If chromia is used the preferred concentration will be about 20 to 25 percent by weight, although it may vary over the range of from about 15 percent to about 30 percent by weight. Either metal oxide may be used alone or they may be admixed. When a mixture is preferred it may be obtained by mixing the finished contact materials in the above proportions or by depositing the nickel oxide and chromia as an integral step in the catalytic material preparation. A highly active catalytic material suitable for the lower portion of the bed comprises from about 20 percent to about 25 percent nickel oxide deposited on such supports as kaolin, zirconia, alumina or other conventional inert material.

In carrying out a typical combined catalytic reforming and partial combustion process for the production of ammonia synthesis gas a hydrocarbon material, for example, a normally gaseous hydrocarbon such as methane, ethane or propane, or a coal gas, or a mixture of gases from the gasification of coal, or a synthesis gas containing unconverted hydrocarbon, or a hydrocarbon or a mixture of hydrocarbons, normally liquid but vaporizable at temperatures below about 1000 to 1400° F., for example, gasoline, kerosene, distillates, gas oil, etc., is preheated to between about 1000 and about 1600° F. The high level of preheat is desirable for two reasons. First, it decreases the amount of heat which otherwise would have to be supplied from the partial combustion reactions and thereby decreases oxygen consumption. Second, preheating the hydrocarbon feed to a high temperature before combining it with oxygen makes it possible to pass more quickly through the temperature range in which carbon deposition takes place.

The preheated hydrocarbon and oxygen containing gas, steam or $CO_2$, which also may be preheated, are introduced into a reaction chamber. Depending on its source the feed may also contain $H_2$ and other gaseous materials. More usually these gases, with the exception of the oxygen containing gas, are combined before their passage into said chamber. Varying amounts of oxygen and steam or $CO_2$ are used in carrying out this process; however, more usually, oxygen is provided in an amount between about 0.3 and 0.8 mol per mol of organic carbon equivalent of hydrocarbon and the steam or $CO_2$ is supplied in a ratio between about ½ and about 2 mols per mol of organic carbon equivalent.

In the preferred embodiment of this invention, the reactants enter the reactor and are mixed above the top level of catalytic material contained therein. As the reactants enter the initial portion of the catalyst bed, partial combustion begins to take place immediately. At the same time, accelerated by the presence of nickel oxide or chromia or a mixture thereof deposited on the refractory support, endothermic steam reforming reactions also take place. The heat given off by partial combustion is consumed in part by the simultaneous reforming reactions thereby holding down the temperature in the top portion of the reactor. With this arrangement of contact material, the reactions associated with high temperatures and uncontrolled partial oxidation, which produce carbon, are repressed. More usually the maximum temperature reached in the top of the catalyst bed varies between about 1700° F. and about 2000° F.

The reactants from the initial portion of the catalyst bed pass into the subsequent or more active portion of the catalyst bed where the clean up portion of the reforming reactions take place, with an accompanying decrease in temperature in the direction of flow of between about 150° F. and about 500° F.

In a preferred embodiment of this invention the hydrocarbon, steam and/or $CO_2$ and oxygen are introduced into the reaction chamber in such a manner as to substantially eliminate carbon deposition and provide a process wherein equipment failure due to erosion and excessive temperature is minimized and in which catalyst faillre is substantially eliminated. These objectives are accomplished by improved methods of mixing the reactants prior to their admission to the reaction zone and by an improved method of contacting the reactants and the reforming catalyst.

In carrying out the invention there is provided a reaction zone, the upper portion of which is free of catalyst. An oxygen containing gas is introduced through a confined zone disposed within the upper portion of the synthesis reaction zone and passes through the confined zone into a mixing zone above the catalyst level in said reaction zone. The mixture of hydrocarbon and other gases which constitute the feed are preheated and introduced to the reaction zone into the space surrounding the confined oxygen inlet zone and pass therefrom into the mixing zone. In general, two types of arrangements may be used for mixing the reactants. In one, the oxygen inlet zone is disposed centrally in the reaction synthesis zone and the oxygen containing gas is passed therethrough into the mixing zone and diffused outwardly into a surrounding blanket of hydrocarbon feed gases. In the second system, the oxygen containing gas is introduced around the periphery of the mixing zone and diffused inwardly into the hydrocarbon feed gases entering the mixing zone.

Several expedients are used to promote mixing of the reactants, all of which apply in general to both types of systems described above. One method comprises introducing the oxygen containing gas into the mixing zone in the form of a plurality of high velocity streams of small cross-section in such a manner as to provide uniform and rapid mixing of the reactants. When using an arrangement of the second type mentioned above, normally where the oxygen containing gas is introduced around the periphery of the mixing zone, the high velocity oxygen containing streams are introduced at an angle to the longitudinal axis of the mixing zone in such a manner that the streams converge on the longitudinal axis thereby forming a cone having its apex on this axis. The angle formed by each oxygen stream and the axis of the mixing zone is preferably maintained at between about 30° and about 60° although it may vary from as low as 15° to as high as 75°. The oxygen containing streams are sized and are of a sufficient number to provide a high velocity relative to the hydrocarbon feed gas mixture, namely between about 3:1 and about 12:1, or more preferably between about 5:1 and about 8:1. Another method used to promote mixing of the reactants includes the additional expedient of introducing each of the oxygen containing gas streams at an angle displaced from the longitudinal axis of the mixing zone so that a tangential motion is imparted to the gas streams whereby the streams converge to form a circle around the axis of flow. The velocity relationships previously given are also maintained here and the angle of displacement for each gas stream is defined by the limits set forth above for the oxygen containing gas streams and the longitudinal axis of the mixing zone. It is also within the scope of the invention to operate in accordance with first method with the oxygen containing gas streams so disposed as to shift the apex of the cone to the longitudinal axis. Likewise the angle of entry of the oxygen containing gas streams when utilizing the expedient mentioned may be varied so that the streams form a non-circular path of convergence and one that is not necessarily centered on the axis of flow.

When carrying out this invention according to the first type of arrangement previously discussed, namely where the oxygen containing gas is introduced to the mixing zone from around the periphery thereof, it is also desirable to introduce the oxygen containing gas in the form of a plurality of high velocity streams of small cross-section. In this instance, however, the streams are directed away from rather than toward the longitudinal axis of the mixing zone. The angles formed by each of the oxygen containing gas streams and the axis of the mixing zone conform in general to those previously given and the quantity and size of these streams are adjusted to provide relative velocities within the ranges prescribed for the other general type of operation.

In addition to the aforedescribed methods for promoting mixing of the reactants a further advantage is gained by introducing the hydrocarbon feed gas mixture into the space surrounding the oxygen inlet zone through a tangential nozzle whereby swirling motion is imparted to this material.

The turbulence which results is dependent to a great extent on the velocity of the feed gases. Inasmuch as high velocities are not normally employed in the catalyst zone it is usually desirable to provide a feed inlet zone of smaller cross-section than the catalyst zone and thereby obtain a higher velocity in the former zone. In a like manner, the cross-section of the mixing zone may be varied to provide optimum turbulence and mixing of the various reactant streams. More usually the velocity of the feed gases in the linear direction of flow will vary between about 90 and about 10 ft./second in both the feed inlet zone and in the mixing zone, and more preferably between about 50 and about 15 ft./second. To further augment the turbulence of the feed gas mixture this material before entering the mixing zone may be passed through a diffuser whereby a greater swirling motion is imparted to the gases. Thus, in either of the general arrangements provided, the mixing zone contains a swirling mass of hydrocarbon feed gases into which the oxygen reactant is introduced through a plurality of high velocity streams.

The primary purpose of the methods described is to provide for speedy, intimate mixing of the reactants thereby preventing spots of high oxygen concentration which would produce localized overheating. Where the mixing is inadequate, tests have shown that hot spots do occur and may result in nozzle damage either because of mechanical failure or because of a combination of erosion, corrosion, fusion, and mechanical failure.

It is desirable in order to prevent flame combustion in the mixing zone that the time which elapses between mixing of the reactants and entry of the mixture into the catalyst bed be held to a minimum, that is, not more than 0.2 second and preferably between about 0.01 and about 0.05 second. Once the reactants enter the catalyst bed, heat is absorbed by the endothermic reforming reactions which occur simultaneously with partial oxidation. This prevents excessive temperature rise and possible catalyst and equipment failure. In order to limit the aforementioned time of non-catalytic contact of the reactants, mixing close to the catalyst bed is preferred, usually between about 0.5 and about 3 feet from said bed. In addition, the velocity of the reactants after admixing is maintained above about 10 feet per second and preferably between about 50 and about 150 feet per second.

Figure 2:
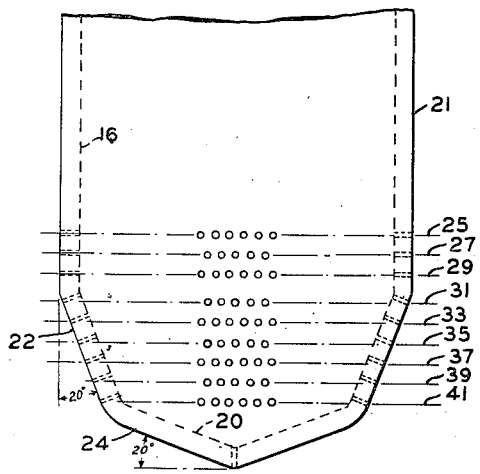
Figure 3:
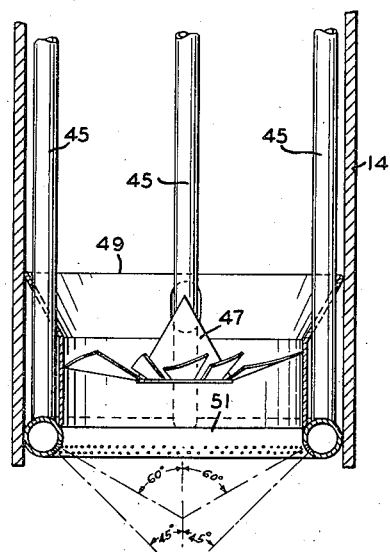

In order to more clearly define the invention and provide a better understanding thereof, reference is had to the accompanying drawings of which:

Figure 1 is a partial view in cross-section of a synthesis gas reactor and an apparatus suitable for introducing reactants into said reactor whereby the oxygen containing gas is introduced to the mixing zone in the central portion thereof, Figure 2 is an enlarged partial view in cross-section of the oxygen containing gas system of Figure 1, the arrangement of the ports through which oxygen is introduced, and Figure 3 illustrates apparatus suitable for use in a system similar to Figure 1 wherein oxygen containing gas is introduced at the periphery rather than in the center of the mixing zone.

Referring to Figure 1, the synthesis reactor 1 consists of a vertical cylindrical vessel having an upper portion of relatively small cross-section and enlarging gradually into a lower section of relatively large cross-section. In this specific illustration the section of small cross-section comprises the inlet portion 11 of the reactor and the tapered section encloses the section 9 wherein the reactants are mixed. The combined material from the mixing section 9 then enters the catalyst bed 7 wherein the synthesis gas reactions proceed as previously described.

Air is introduced to the reactor through a conduit 5 which passes through the reactor top flange 3 and extends downwardly through the inlet section 11. The bottom portion of this conduit terminates in an expanded nozzle section 21 which extends into the mixing section 9 and from which air is introduced to this section. The entire nozzle assembly is centrally disposed within the reactor and is supported in a vertical direction by welding conduit 5 to flange 3. In addition, a degree of lateral support is provided by a blade diffuser 19 which surrounds and is attached to the expanded section 21. This element of the mixing apparatus is sized so that the tips of the blades under operating temperature are only a small distance from the inner surface of the inlet section 11, thus assuring flow of the feed gases through the diffuser blades and also substantially preventing lateral movement of the expanded section 21. The catalyst bed 7 is maintained at a sufficient level below the exit terminus of the expanded section 21 to provide thorough mixing of the reactants prior to their entry into the catalyst and yet sufficiently close to the catalyst bed to insure contact of the reactants and catalyst before flame combustion can occur. In this specific illustration, the nozzle terminates about two feet above the top level of the catalyst.

The hydrocarbon feed mixture consisting of methane and steam is introduced to the inlet section 11 through a tangential nozzle 17 which imparts a clockwise swirling motion to this material. This motion is increased further by the blades of the diffuser 19 before the gas enters the mixing zone 9. To protect the walls of the reactor 1 from the high temperatures encountered during the synthesis gas formation, this vessel is lined with a heat resistant material 15. Examples of suitable materials for this use are refractories which have as their principal constituent zirconia, alumina, silicon-carbide or similar materials. Additional protection for the reactor in the catalyst zone wherein the highest temperatures occur is provided by the installation of a layer of refractory firebrick 18. As a result of these precautions, it is possible to carry out this high temperature reaction in a reactor constructed of relatively inexpensive carbon steel.

The insulating refractory material 15 provides adequate temperature protection in the inlet section 11; however, this material is not intended to resist the erosive action which results from the turbulence and swirling motion of the hydrocarbon feed gases, introduced through nozzle 17. To protect the refractory a stainless steel liner 14 is placed adjacent thereto and is extended from the top reactor flange 3 to slightly below the diffuser 19 and beyond the point where the firebrick 18 begins.

It is not practicable to provide insulation for the complete protection of the air inlet line and nozzle, therefore, these elements are constructed of a heat resistant material preferably a material such as a high temperature stainless steel. In addition to providing the desired thermal properties, materials of this type also furnish protection from the corrosive action of the various reactants. Some degree of additional thermal protection is provided by a layer of insulation 13 around the oxygen inlet line 5.

The lower part of the expanded portion of the discharge end of the air nozzle 21 is shown on a larger scale in Figure 2. Referring to Figure 2, this section of the nozzle, which contains the air discharge ports, is made from 3 formed sections of stainless steel 16, 18 and 20 which are cylindrical in nature and which are joined together by welding. To provide a smooth surface for contact with externally flowing hydrocarbon feed gases, the junctions between the pieces are rounded off at points 22 and 24. As noted in the illustration, the pieces are attached so that section 16 is vertical, section 18 forms an angle of 20 degrees with the vertical and section 20 forms an angle of 20 degrees with the horizontal. This is intended to represent only one method of construction and variations on this configuration are, of course, within the scope of the invention. It is possible, for example, to form the nozzle by substituting a conventional bull plug for pieces 20 and 18 by other suitable means.

Several rows or series of holes 25, 27, 29, etc., circumferentially arranged are provided in the nozzle for the introduction of air into the mixing zone. These holes which are 3/16 of an inch in diameter are perpendicular to the outer surface of the nozzle and are staggered so that holes in adjacent series form equilateral triangles. With this type of arrangement, the holes of series 25, 27, 29 and 31 are perpendicular to the longitudinal axis of the nozzle and the remaining holes form an angle of about 70 degrees with said axis. In the particular nozzle illustrated, the holes are spaced about 0.4 inch apart and the number of holes may vary from about 50 in series 41 to about 70 in series 25, 27, 29 and 31.

As noted previously, two general types of arrangements for introducing the synthesis gas reactants may be used. Having now described one arrangement wherein air is introduced centrally into the mixing zone, reference is now had to Figure 3 wherein the peripheral introduction of air is illustrated. In Figure 3 the air is admitted through a series of conduits 45 disposed symmetrically around the inner periphery of the inlet zone 11. These conduits pass through the top reactor flange 3 and are supported by welding to flange 3. At their bottom ends, the conduits openly communicate with a ring shaped conduit 51 to which they are perpendicularly attached by welding or other suitable means. The bottom portion of ring 51 contains two rows or series of holes which are bored perpendicular to the face of the ring. These holes are provided for the introduction of air into the mixing zone 9. The streams of air admitted through the top row of holes produce a cone having its apex on the perpendicular axis of ring 51 and form an angle of about 60 degrees with said axis. The lower series of holes being closer to the bottom of the ring form a lesser angle with the longitudinal axis, namely about 45 degrees. As in the nozzle of Figure 2, the holes are equilaterally spaced to provide a thorough diffusion of the oxygen reactant. Due to the greater size of the ring as compared to the nozzle of Figure 2, it is possible to provide more holes in each row, namely about 100. However, the ring has only two rows as compared to nine rows in the previously described nozzle, therefore, it is necessary to provide larger holes in order to maintain substantially the same velocity of the oxygen streams.

As in the previous example the hydrocarbon feed mixture is admitted to the inlet section 11 through a tangential nozzle 17 and the swirling motion thereby produced is increased in magnitude as the gases pass through diffuser blades 47. Passage of gases other than through the diffuser is prevented by a stainless steel shroud 49 which is adjacent to the inner surface of the inlet section 11 at its top and at its bottom is welded to the top portion of ring 51.

The illustrated nozzles present two of the apparatus variations which are possible in carrying out this invention. The advantages and disadvantages presented by each specific arrangement will be apparent to those skilled in the art and will not be discussed herein. The important result which is obtained in the nozzles described is rapid and thorough mixing of the reactants prior to their entrance into the catalyst bed. It is understood that the invention is not to be limited by the specific illustrations presented, and in particular relating to the arrangement of the oxygen ports. For example, it may be desirable in a single nozzle to provide ports of more than one size and located to provide dissimilar angles of degree from those stated in the description of Figures 1 and 2. It is also within the scope of the invention to carry out the mixing step in a section having a constant cross-sectional area in the direction of flow and one equal to less than or greater than the cross-sectional area of the inlet section.

Although the invention has been described in its particular aspect as relating to the preparation of synthesis gas, it is not intended that it be limited to such a use but that it find application in any process wherein it is desirable to mix gases uniformly, particularly where rapidity of mixing is desirable in order to prevent unwanted reactions, corrosive conditions, etc.

To illustrate a typical application of the invention, the following specific example is presented in conjunction with the nozzle shown in Figure 2.

Feed material comprising the effluent from a steam-methane furnace reforming reaction of the composition shown in the table is introduced through conduit 17 into the inlet section 11 (at a temperature of about 1500° F.).

*Feed composition*

| Components: | lb./hr. |
|---|---|
| $H_2$ | 1,860 |
| $N_2$ | 40 |
| CO | 4,820 |
| $CH_4$ | 1,940 |
| $CO_2$ | 4,890 |
| $H_2O$ | 8,900 |
| | 22,450 |

Oxygen for the partial combustion reaction is provided by introducing air into conduit 5. The reactants are combined in the mixing section 9 by introduction of the air from ports in nozzle 21, as a plurality of high velocity streams, into a swirling mass of hydrocarbon feed mixture. The total quantity of reactants is controlled to provide a combined average velocity after mixing of about 50 feet per second whereby the total residence time of the mixed gases in the mixing section is less than 0.05 second. Immediately after the gases come in contact reaction between the oxygen and hydrocarbon takes place. However, the high velocity of the reactants causes them to pass into contact with the catalyst mass before flame combustion can occur. In this particular operation, the catalyst comprises nickel oxide deposited on alumina disposed in the catalyst chamber as irregular fragments to form a fixed bed. The upper portion of the catalyst bed, constituting about 35 percent by volume thereof, contains highly refractory catalyst having a nickel oxide content of about 7 percent and the lower portion of the bed contains a more active but less refractory catalyst containing about 25 percent nickel oxide. When the reactants initially contact the catalyst, the exothermic oxidation reaction predominates over the steam reforming reaction and a temperature of about 1900° F. results. As the reactants pass downwardly through the bed, however, increased reforming occurs and the temperature is decreased to about 1700° F. leaving the bottom of the bed.

In this specific operation which is carried out at a pressure of about 125 pounds per square inch gage the product gas which has the composition shown in the table is used in the synthesis of ammonia.

*Product composition*

| Components: | lb./hr. |
|---|---|
| $H_2$ | 2,110 |
| $N_2$ | 12,180 |
| CO | 7,980 |
| A | 225 |
| $CH_4$ | 60 |
| $CO_2$ | 5,080 |
| $H_2O$ | 10,920 |
| | 38,555 |

Having thus described the invention by reference to a specific application, it should be understood that no undue limitations should be imposed by reason thereof, but that the scope of the invention is defined by the appended claims.

I claim:

1. Apparatus for the conversion of hydrocarbons which comprises a vertical reaction chamber containing a mixing section in the upper portion thereof and a bed of catalyst below said mixing section, a cylindrical section of smaller cross-sectional area than the reaction chamber axially aligned with the mixing section of said reaction chamber and superposed on the reaction chamber, said cylindrical section in open communication with said cylindrical mixing section, nozzle means centered on the axis of said cylindrical section disposed within said cylindrical section and said mixing section to discharge gasiform material into said mixing section, means for introducing a gaseous hydrocarbon feed mixture into said cylindrical section tangentially to the inner wall thereof to impart swirling turbulent motion to said feed mixture, diffusing means adjacent the juncture of said inlet section and said mixing section and including flow directing vanes to provide passage of the gaseous hydrocarbon feed mixture therethrough thereby increasing the swirling motion of said mixture on its way to said mixing section, means for introducing air into said nozzle means, and means for passing said air from said nozzle means into the mixing section in the form of a plurality of small, convergent streams having a high velocity relative to the velocity of the hydrocarbon feed mixture whereby uniform and rapid mixing takes place before the gases enter the catalyst bed.

2. Apparatus for the conversion of hydrocarbons which comprises a vertical reaction chamber containing a mixing section in the upper portion thereof and a bed of catalyst below said mixing section, a cylindrical section of smaller cross-sectional area than the reaction chamber superposed on the reaction chamber and openly communicating with the mixing section thereof, nozzle means disposed within the cylindrical section and the mixing section around the inner periphery of said sections to discharge gasiform material into the mixing section, means for introducing a gaseous hydrocarbon feed mixture into the cylindrical section tangentially to the inner wall thereof to impart swirling turbulent motion to said feed mixture, diffusing means adjacent the juncture of the inlet section and the mixing section and including flow directing vanes to provide passage of the gaseous hydrocarbon feed mixture therethrough thereby increasing the swirling motion of said mixture on its way to the mixing section, means for introducing air into the nozzle means and means for passing said air from the nozzle means into the mixing section in the form of a plurality of small, convergent streams having a high velocity relative to the velocity of the hydrocarbon feed mixture whereby uniform and rapid mixing takes place before the gases enter the catalyst bed.

References Cited in the file of this patent

UNITED STATES PATENTS

| | | |
|---|---|---|
| 938,182 | Todd et al. | Oct. 26, 1909 |
| 942,709 | Brady | Dec. 7, 1909 |
| 1,352,351 | Byers | Sept. 7, 1920 |
| 1,918,254 | Faber | July 18, 1933 |
| 2,135,695 | Bardwell | Nov. 8, 1938 |
| 2,672,402 | Stokes | Mar. 16, 1954 |
| 2,750,420 | Hepp | June 12, 1956 |
| 2,781,250 | Miller | Feb. 12, 1957 |